(12) United States Patent
Zheng

(10) Patent No.: US 10,873,666 B2
(45) Date of Patent: Dec. 22, 2020

(54) CAMERA TRACKING METHOD AND DIRECTOR DEVICE

(71) Applicant: HUAWEI TECHNOLOGIES CO., LTD., Shenzhen, Guangdong (CN)

(72) Inventor: Zhiwei Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/791,268

(22) Filed: Feb. 14, 2020

(65) Prior Publication Data

US 2020/0186649 A1 Jun. 11, 2020

Related U.S. Application Data

(63) Continuation of application No. PCT/CN2018/099340, filed on Aug. 8, 2018.

(30) Foreign Application Priority Data

Aug. 16, 2017 (CN) .......................... 2017 1 0702192

(51) Int. Cl.
*H04M 3/56* (2006.01)
*G10L 25/78* (2013.01)
(Continued)

(52) U.S. Cl.
CPC ............. *H04M 3/567* (2013.01); *G10L 25/78* (2013.01); *H04N 7/142* (2013.01); *H04N 7/147* (2013.01); *H04N 7/152* (2013.01)

(58) Field of Classification Search
CPC combination set(s) only.
See application file for complete search history.

(56) References Cited

U.S. PATENT DOCUMENTS 6,208,373 B1 * 3/2001 Fong ...................... H04N 7/144
 348/14.03
6,766,035 B1 7/2004 Gutta
(Continued)

FOREIGN PATENT DOCUMENTS

| CN | 102843543 A | 12/2012 |
| CN | 104349040 A | 2/2015 |

(Continued)

OTHER PUBLICATIONS

International Search Report issued in PCT/CN2018/099340 dated Nov. 1, 2018 (4 pages).
(Continued)

*Primary Examiner* — Phung-Hoang J Nguyen

(57) ABSTRACT

In a camera tracking method and apparatus, and a device, a director device determines speech information of speaker in a preset time period. The director device determines a current speaker based on second video information collected by the first camera at a current moment and second audio information collected by the plurality of MICs at the current moment. The director device controls a director status of at least one director camera based on the speech information of speaker, the current speaker, and a speaker shot by the at least one director camera at the current moment. The director camera is configured to send a director video stream to another conference site. This avoids frequent and unnecessary switching of the director camera.

20 Claims, 10 Drawing Sheets

(51) Int. Cl.
*H04N 7/14* (2006.01)
*H04N 7/15* (2006.01)

(56) References Cited

U.S. PATENT DOCUMENTS

| | | | |
|---|---|---|---|
| 8,395,653 B2 | 3/2013 | Feng et al. | |
| 9,094,615 B2* | 7/2015 | Aman | H04N 5/23238 |
| 9,641,801 B2 | 5/2017 | Chen et al. | |
| 2008/0218582 A1 | 9/2008 | Buckler | |
| 2009/0154571 A1 | 6/2009 | Choe | |
| 2009/0167840 A1* | 7/2009 | Lin | H04N 7/147 |
| | | | 348/14.08 |
| 2010/0123770 A1* | 5/2010 | Friel | H04N 7/15 |
| | | | 348/14.08 |
| 2010/0329358 A1* | 12/2010 | Zhang | H04N 19/187 |
| | | | 375/240.26 |
| 2011/0193935 A1* | 8/2011 | Gorzynski | H04N 7/142 |
| | | | 348/14.08 |
| 2011/0285809 A1 | 11/2011 | Feng et al. | |
| 2012/0033030 A1* | 2/2012 | Liu | H04N 7/15 |
| | | | 348/14.08 |
| 2012/0242777 A1* | 9/2012 | Yu | H04N 7/15 |
| | | | 348/14.07 |
| 2014/0049595 A1 | 2/2014 | Feng et al. | |
| 2016/0065895 A1 | 3/2016 | Chen et al. | |
| 2018/0070051 A1 | 3/2018 | Johnson | |

FOREIGN PATENT DOCUMENTS

| | | |
|---|---|---|
| CN | 104954730 A | 9/2015 |
| CN | 105376515 A | 3/2016 |
| CN | 106063255 A | 10/2016 |
| CN | 106251334 A | 12/2016 |

OTHER PUBLICATIONS

Jingrun Zheng et al.:"Multi-speaker Tracking Based on Audio-video Information Fusion in Smart Environment",dated 2011, total 67 pages.
Extended European Search Report dated Jun. 17, 2020, issued in EP 18846441.6, total 12 pages.

* cited by examiner

CAMERA TRACKING METHOD AND DIRECTOR DEVICE

CROSS-REFERENCE TO RELATED APPLICATIONS

This application is a continuation of International Application No. PCT/CN2018/099340, filed on Aug. 8, 2018, which claims priority to Chinese Patent Application No. 201710702192.4, filed on Aug. 16, 2017. The disclosures of the aforementioned applications are hereby incorporated by reference in their entireties.

TECHNICAL FIELD

This application relates to the field of shoot technologies, and in particular, to a camera tracking method and apparatus, and a device.

BACKGROUND

Currently, a video conference is increasingly widely used. In a video conference scenario, there is usually a director camera in a conference room. Video information of a participant in the conference room is obtained in real time by using the director camera, and the obtained video information is transmitted to another party or a plurality of parties of the conference.

In the prior art, the director camera may automatically switch a director lens to a currently speaking participant by using an acoustic source localization technology. Specifically, an acoustic source is located by using an acoustic source detection device, and the director camera is adjusted based on the acoustic source, so that the director camera can shoot (capture an image of) the currently speaking participant. However, in the prior art, when a speaker in the conference room changes, a camera lens of the director camera is usually switched, and this causes frequent and unnecessarily distracting switching of the camera lens of the director camera.

SUMMARY

This application provides a camera tracking method and apparatus, and a device, to avoid frequent and unnecessary switching of a director camera.

According to a first non-limiting aspect, this disclosure provides a camera tracking method. A director system includes at least one first camera, a plurality of microphones (MICs), a director camera, and a director device. The first camera is configured to collect a local video in real time, the plurality of MICs are configured to collect audio information in real time, the director camera is configured to send a director video stream to another conference site, and the director device is configured to control a director status of the director camera. When the director device needs to control the director status of the director camera, the director device determines historical speech information in a preset time period based on first video information collected by the first camera in the preset time period and first audio information collected by the plurality of microphones MICs in the preset time period, determines a current speaker based on second video information collected by the first camera at a current moment and second audio information collected by the plurality of MICs at the current moment, and controls a director status of at least one director camera based on the historical speech information, the current speaker, and a speaker shot by the at least one director camera at the current moment.

In an example non-limiting embodiment, in a video director process, the director device controls the director status of the at least one director camera based on the determined historical speech information in the preset time period, the current speaker, and the speaker shot by the at least one director camera at the current moment. The historical speech information may reflect information such as a speech mode of a participant in a conference site and importance of the participant. Therefore, the director device may more precisely control the director camera based on the historical speech information, the current speaker, and the speaker shot by the at least one director camera at the current moment, thereby avoiding frequent and unnecessary switching of the director camera.

Optionally, a director status of a director camera may include a shooting angle or a focal length, and the at least one director camera includes a first director camera and a second director camera. Correspondingly, the director device may control the director status of the at least one director camera in the following feasible implementations.

When the current speaker is the same as a speaker shot by the first director camera at the current moment, the director device keeps a shooting angle and a focal length of the first director camera unchanged, where a pilot video shot by the first director camera is sent to the another conference site at the current moment.

When the current speaker is different from a speaker shot by the first director camera at the current moment, the director device adjusts a shooting angle or a focal length of at least one of the first director camera and the second director camera based on the historical speech information.

Optionally, when the current speaker is different from the speaker shot by the first director camera at the current moment, the director device determines a speech mode in the preset time period based on the historical speech information, and adjusts the shooting angle or the focal length of at least one of the first director camera and the second director camera based on the speech mode in the preset time period. The speech mode includes at least one of a single-person speech mode, a double-person debate mode, or a multi-person discussion mode.

In another possible implementation, the director device may determine the speech mode in the preset time period based on the historical speech information in the following feasible implementations.

The director device determines a quantity of effective speakers in the preset time period based on the historical speech information. Optionally, the director device determines a quantity of effective speech times of each speaker based on a priority of each speaker in the preset time period and speech duration of each speaker in each speech in the preset time period; determines a speaker whose quantity of effective speech times is greater than or equal to 1 as an effective speaker; and determines a quantity of effective speakers as the quantity of effective speakers.

The director device determines the speech mode in the preset time period based on the quantity of effective speakers in the preset time period. Optionally, when the quantity of effective speakers is 1, the director device determines that the speech mode in the preset time period is the single-person speech mode; when the quantity of effective speakers is 2, if the two effective speakers speak alternately, the director device determines that the speech mode in the preset time period is the single-person speech mode or the double-person debate mode; or when the quantity of effective speakers is greater than 2, the director device determines, based on priorities of at least two effective speakers in the preset time period, that the speech mode in the preset time period is the single-person speech mode or the multi-person discussion mode.

Optionally, if the at least two effective speakers include an important speaker, the director device determines that the speech mode in the preset time period is the single-person speech mode; or if the at least two effective speakers do not include an important speaker, the director device determines that the speech mode in the preset time period is the multi-person discussion mode.

Based on different speech modes, processes in which the director device controls the first director camera or the second director camera are also different. At least three feasible implementations below may be included.

In a first feasible implementation, the speech mode is the single-person speech mode.

In this feasible implementation, the director device determines a target speaker from the effective speakers in the preset time period; and adjusts the shooting angle or the focal length of the second director camera, so that a face image of the target speaker is located at a target shooting location of the second director camera.

Optionally, the target speaker may be determined in the following feasible implementations:

when the quantity of effective speakers in the preset time period is 1, determining one effective speaker in the preset time period as the target speaker; when the quantity of effective speakers in the preset time period is 2, determining the target speaker from the two effective speakers based on priorities of the two effective speakers; or when the quantity of effective speakers in the preset time period is greater than 2, determining an important speaker in the preset time period as the target speaker.

In a second feasible implementation, the speech mode is the double-person debate mode.

If a distance between two effective speakers in the preset time period is less than a preset distance, the director device adjusts the shooting angle or the focal length of the second director camera, so that face images corresponding to the two effective speakers are located at a target shooting location of the second director camera; or if a distance between two effective speakers in the preset time period is greater than or equal to a preset distance, the director device adjusts the shooting angle or the focal length of at least one of the first director camera and the second director camera, so that a face image corresponding to one of the two effective speakers is located at a target shooting location the first director camera and a face image corresponding to the other effective speaker is located at a target shooting location of the second director camera.

In a third feasible implementation, the speech mode is the multi-person discussion mode.

If a distance between the at least two effective speakers in the preset time period is less than a preset distance, the director device adjusts the shooting angle or the focal length of the second director camera, so that face images corresponding to the at least two effective speakers are located at a target shooting location of the second director camera; or if a distance between the at least two effective speakers in the preset time period is less than a preset distance, the director device adjusts the shooting angle or the focal length of the second director camera, so that the second director camera shoots a panoramic video.

In any one of the foregoing implementations, after the director device adjusts the shooting angle or the focal length of the second director camera, the director device sends a video stream shot by the second director camera to a terminal device, so that the terminal device sends the video stream shot by the second director camera to the another conference site.

In any one of the foregoing implementations, after the director device adjusts the shooting angle or the focal length of at least one of the first director camera and the second director camera, the director device sends a video stream shot by the first director camera and a video stream shot by the second director camera to a terminal device, so that the terminal device sends the video stream shot by the first director camera and the video stream shot by the second director camera to the another conference site.

In another possible implementation, the director device determines historical speech information in a preset time period based on first video information collected by the first camera in the preset time period and first audio information collected by the plurality of microphones MICs in the preset time period by performing a method that includes:

determining, by the director device based on video information and audio information that are corresponding to moments in the preset time period, speakers corresponding to the moments; and collecting, by the director device, statistics about the speakers corresponding to the moments to obtain historical speech information, where the historical speech information includes at least one piece of the following information: a quantity of speakers in the preset time period, speech duration of each speaker, a quantity of speech times of each speaker, speech content of each speaker, speech duration of each speech, a speech moment of each speech, or a priority of each speaker.

Optionally, for a first moment in the preset time period, determining, based on video information and audio information at the first moment, a speaker corresponding to the first moment includes:

determining, by the director device based on the video information at the first moment, a horizontal angle and a vertical angle corresponding to each face image;

determining, by the director device based on the audio information corresponding to the first moment, a horizontal angle and a vertical angle corresponding to an acoustic source at the first moment; and determining, by the director device, the speaker corresponding to the first moment based on the horizontal angle and the vertical angle corresponding to each face image and the horizontal angle and the vertical angle corresponding to the acoustic source.

Optionally, when the first camera is a binocular camera, the determining, by the director device based on the video information at the first moment, a horizontal angle and a vertical angle corresponding to each face image includes:

obtaining, by the director device, two-dimensional coordinates of each face image in two camera lenses of the binocular camera based on the video information at the first moment;

determining, by the director device, a depth of each face image based on a distance between the two camera lenses of the binocular camera and the two-dimensional coordinates of each piece of face information in the two camera lenses, where a depth of a face image is a distance between a face and the binocular camera;

determining, by the director device, three-dimensional coordinates of each face image in a binocular coordinate system based on the depth of each face image, where the binocular coordinate system is a three-dimensional coordinate system that uses one camera lens of the binocular camera as an origin; and determining, by the director device based on the three-dimensional coordinates of each face image in the binocular coordinate system, the horizontal angle and the vertical angle corresponding to each face image.

Optionally, determining the speaker corresponding to the first moment based on the horizontal angle and the vertical angle corresponding to each face image and the horizontal angle and the vertical angle corresponding to the acoustic source includes:

determining, by the director device based on the horizontal angle and the vertical angle corresponding to each face image and the horizontal angle and the vertical angle corresponding to the acoustic source, a distance between a face corresponding to each face image and the acoustic source; and determining, by the director device based on the distance between the face corresponding to each face image and the acoustic source, the speaker corresponding to the first moment.

According to a second aspect, this disclosure provides a camera tracking apparatus, including a first determining module/function, a second determining module/function, and a control module/function. Each of the respective modules/functions may be implemented by at least one processor executing software, at least one hardwired circuit, or both. The same processor and/or circuit or different processors and/or circuits may implement/perform the first determining module/function, the second determining module/function, and the control module/function. Thus, the respective modules may comprise software modules and/or hardware modules, and may be implemented by software functions and/or hardware functions.

The first determining module/function is configured to determine historical speech information in a preset time period based on first video information collected by a first camera in the preset time period and first audio information collected by a plurality of microphones MICs in the preset time period, where the first camera is configured to collect a local video.

The second determining module/function is configured to determine a current speaker based on second video information collected by the first camera at a current moment and second audio information collected by the plurality of MICs at the current moment.

The control module/function is configured to control a director status of at least one director camera based on the historical speech information, the current speaker, and a speaker shot by the at least one director camera at the current moment, where the director camera is configured to send a director video stream to another conference site.

In a possible implementation, a director status of a director camera includes a shooting angle or a focal length, and the at least one director camera includes a first director camera and a second director camera. The control module/function in this implementation is specifically configured to:

when the current speaker is the same as a speaker shot by the first director camera at the current moment, keep a shooting angle and a focal length of the first director camera unchanged, where a pilot video shot by the first director camera is sent to the another conference site at the current moment; or when the current speaker is different from a speaker shot by the first director camera at the current moment, adjust a shooting angle or a focal length of at least one of the first director camera and the second director camera based on the historical speech information.

In another possible implementation, the control module/function includes a determining unit and an adjustment unit. The determining unit may comprise a processor, software executing on a processor, hardware circuitry, or any combination of these. Similarly, the adjustment unit may comprise a processor, software executing on a processor, hardware circuitry, or any combination of these.

The determining unit is configured to: when the current speaker is different from the speaker shot by the first director camera at the current moment, determine a speech mode in the preset time period based on the historical speech information, where the speech mode includes at least one of a single-person speech mode, a double-person debate mode, or a multi-person discussion mode.

The adjustment unit is configured to adjust the shooting angle or the focal length of at least one of the first director camera and the second director camera based on the speech mode in the preset time period.

In another possible implementation, the determining unit is specifically configured to:

determine a quantity of effective speakers in the preset time period based on the historical speech information; and determine the speech mode in the preset time period based on the quantity of effective speakers in the preset time period.

In another possible implementation, the determining unit is specifically configured to:

determine a quantity of effective speech times of each speaker based on a priority of each speaker in the preset time period and speech duration of each speaker in each speech in the preset time period;

determine a speaker whose quantity of effective speech times is greater than or equal to 1 as an effective speaker; and determine a quantity of the effective speakers as the quantity of effective speakers.

In another possible implementation, the determining unit is specifically configured to:

when the quantity of effective speakers is 1, determine that the speech mode in the preset time period is the single-person speech mode;

when the quantity of effective speakers is 2, if the two effective speakers speak alternately, determine that the speech mode in the preset time period is the single-person speech mode or the double-person debate mode; or when the quantity of effective speakers is greater than 2, determine, based on priorities of at least two effective speakers in the preset time period, that the speech mode in the preset time period is the single-person speech mode or the multi-person discussion mode.

In another possible implementation, the determining unit is specifically configured to:

if the at least two effective speakers include an important speaker, determine that the speech mode in the preset time period is the single-person speech mode; or if the at least two effective speakers do not include an important speaker, determine that the speech mode in the preset time period is the multi-person discussion mode.

In another possible implementation, the speech mode is the single-person speech mode; and the adjustment unit is specifically configured to:

determine a target speaker from the effective speakers in the preset time period; and adjust the shooting angle or the focal length of the second director camera, so that a face image of the target speaker is located at a target shooting location of the second director camera.

In another possible implementation, the adjustment unit is specifically configured to:

when the quantity of effective speakers in the preset time period is 1, determine one effective speaker in the preset time period as the target speaker;

when the quantity of effective speakers in the preset time period is 2, determine the target speaker from the two effective speakers based on priorities of the two effective speakers; or when the quantity of effective speakers in the preset time period is greater than 2, determine an important speaker in the preset time period as the target speaker.

In another possible implementation, the speech mode is the double-person debate mode; and the adjustment unit is specifically configured to:

if a distance between two effective speakers in the preset time period is less than a preset distance, adjust the shooting angle or the focal length of the second director camera, so that face images corresponding to the two effective speakers are located at a target shooting location of the second director camera; or if a distance between two effective speakers in the preset time period is greater than or equal to a preset distance, adjust the shooting angle or the focal length of at least one of the first director camera and the second director camera, so that a face image corresponding to one of the two effective speakers is located at a target shooting location the first director camera and a face image corresponding to the other effective speaker is located at a target shooting location of the second director camera.

In another possible implementation, the speech mode is the multi-person discussion mode; and the adjustment unit is specifically configured to:

if a distance between the at least two effective speakers in the preset time period is less than a preset distance, adjust the shooting angle or the focal length of the second director camera, so that face images corresponding to the at least two effective speakers are located at a target shooting location of the second director camera; or if a distance between the at least two effective speakers in the preset time period is greater than or equal to than a preset distance, adjust the shooting angle or the focal length of the second director camera, so that the second director camera shoots a panoramic video.

In another possible implementation, the apparatus further includes a sending module/function. The sending module/function may comprise a processor, software executing on a processor, hardware circuitry, or any combination of these.

The sending module/function is configured to: after the adjustment unit adjusts the shooting angle or the focal length of the second director camera, send a video stream shot by the second director camera to a terminal device, so that the terminal device sends the video stream shot by the second director camera to the another conference site.

In another possible implementation, the sending module/function is further configured to:

after the adjustment unit adjusts the shooting angle or the focal length of at least one of the first director camera and the second director camera, send a video stream shot by the first director camera and a video stream shot by the second director camera to a terminal device, so that the terminal device sends the video stream shot by the first director camera and the video stream shot by the second director camera to the another conference site.

In another possible implementation, the first determining module/function is specifically configured to:

determine, based on video information and audio information that are corresponding to moments in the preset time period, speakers corresponding to the moments; and collect statistics about the speakers corresponding to the moments to obtain the historical speech information, where the historical speech information includes at least one piece of the following information: a quantity of speakers in the preset time period, speech duration of each speaker, a quantity of speech times of each speaker, speech content of each speaker, speech duration of each speech, a speech moment of each speech, or a priority of each speaker.

In another possible implementation, for a first moment in the preset time period, the first determining module/function is specifically configured to:

determine, based on video information at the first moment, a horizontal angle and a vertical angle corresponding to each face image;

determine, based on audio information corresponding to the first moment, a horizontal angle and a vertical angle corresponding to an acoustic source at the first moment; and determine a speaker corresponding to the first moment based on the horizontal angle and the vertical angle corresponding to each face image and the horizontal angle and the vertical angle corresponding to the acoustic source.

In another possible implementation, the first camera is a binocular camera; and the first determining module/function is specifically configured to:

obtain two-dimensional coordinates of each face image in two camera lenses of the binocular camera based on the video information at the first moment;

determine a depth of each face image based on a distance between the two camera lenses of the binocular camera and the two-dimensional coordinates of each piece of face information in the two camera lenses, where a depth of a face image is a distance between a face and the binocular camera;

determine three-dimensional coordinates of each face image in a binocular coordinate system based on the depth of each face image, where the binocular coordinate system is a three-dimensional coordinate system that uses one camera lens of the binocular camera as an origin; and determine, based on the three-dimensional coordinates of each face image in the binocular coordinate system, the horizontal angle and the vertical angle corresponding to each face image.

In another possible implementation, the first determining module/function is specifically configured to:

determine, based on the horizontal angle and the vertical angle corresponding to each face image and the horizontal angle and the vertical angle corresponding to the acoustic source, a distance between a face corresponding to each face image and the acoustic source; and determine, based on the distance between the face corresponding to each face image and the acoustic source, the speaker corresponding to the first moment.

According to a third aspect, this disclosure provides a director device, including a processor, a memory, and a communications bus. The communications bus is configured to implement connections between components, the memory is a non-transitory memory that is configured to store program instructions, and the processor is configured to: read the program instruction in the memory, and perform, based on the program instruction in the memory, the method according to any implementation of the first aspect.

According to a fourth aspect, this disclosure provides a non-transitory computer-readable storage medium. The computer-readable storage medium stores one or more computer executable instructions. When at least one processor of a storage device executes the computer executable instruction(s), the storage device performs the camera tracking method provided in the foregoing possible designs.

According to a fifth aspect, this disclosure provides a computer program product. The computer program product includes one or more computer executable instructions. The computer executable instruction(s) is/are stored in a non-transitory computer-readable storage medium. At least one processor of a storage device may read the computer executable instruction(s) from the computer-readable storage medium. The at least one processor executes the computer executable instruction(s), so that the storage device implements the camera tracking method provided in the possible designs in the foregoing method embodiment.

According to a sixth aspect, this disclosure provides a chip system. The chip system includes a processor, configured to support a director device in implementing a function in the foregoing aspects, for example, processing information in the foregoing method. In a possible design, the chip system further includes a memory, and the memory is configured to store one or more program instructions and data required by the director device. The chip system may include a chip, or may include a chip and another discrete device.

According to non-limiting implementations of the camera tracking method and apparatus, and the device provided in this disclosure, in the video director process, the director device controls the director status of the at least one director camera based on the determined historical speech information in the preset time period, the current speaker, and the speaker shot by the at least one director camera at the current moment. The historical speech information may reflect the information such as a speech mode of a participant in a conference site and importance of the participant. Therefore, the director device may more precisely control the director camera based on the historical speech information, the current speaker, and the speaker shot by the at least one director camera at the current moment, thereby avoiding frequent and unnecessary switching of the director camera.

DESCRIPTION OF EXAMPLE NON-LIMITING EMBODIMENTS

Figure 1:
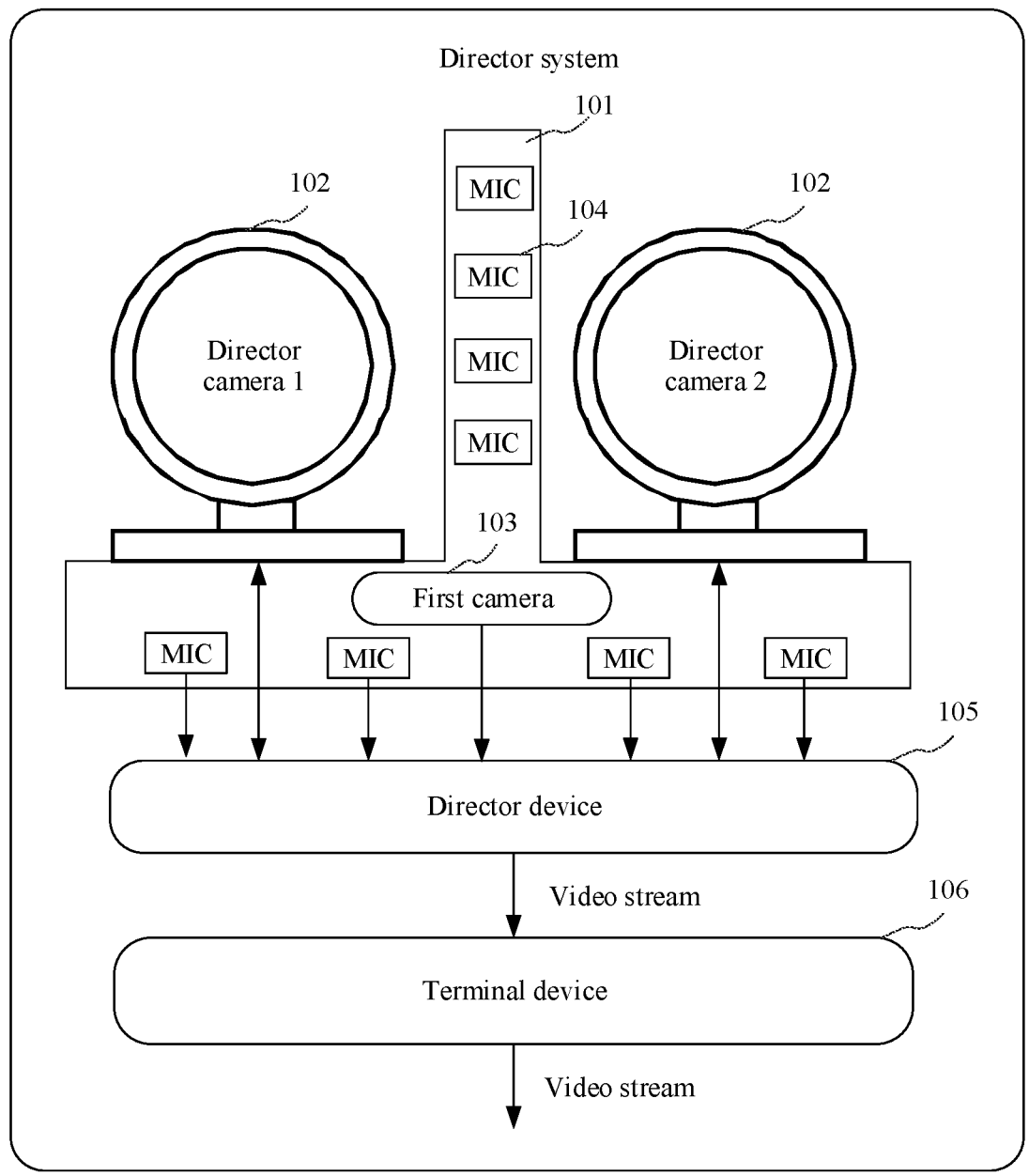
FIG. 1 is a schematic diagram of an example non-limiting application scenario of a camera tracking method.

FIG. 1 is a schematic diagram of an application scenario of a camera tracking method. Referring to FIG. 1, there is a director system in a local conference site, and the director system may track and "shoot" (i.e., capture a sequence of images of) a speaker in the conference site, and transmit a shot video stream to another conference site in real time. The director system includes a camera support 101, a director camera 102, a first camera 103, a microphone (MIC) array 104, a director device 105, and a terminal device 106. The director camera 102, the first camera 103, and the MIC array 104 are separately disposed on the camera support.

Optionally, a quantity of director cameras 102 may be one, three, or the like. A video stream shot by the director camera 102 is transmitted to the another conference site. It should be noted that, when there are a plurality of director cameras 102, only video streams shot by some director cameras 102 (one or more) may be transmitted to the another conference site at a same moment. The first camera 103 may be a binocular camera, and the first camera 103 may shoot an image of the entire conference site. A video shot by the first camera 103 is only used for local processing, and is not used for transmission to the another conference site. Audio collected by a plurality of MICs in the MIC array 104 is only used for local processing, and is not used for transmission to the another conference site. The quantity of director cameras included in the director system is not specifically limited, and the quantity of MICs included in the MIC array is not specifically limited either.

In an actual application process, the first camera 103 may collect video information in the conference site in real time, and transmit the collected video information to the director device 105. The MIC in the MIC array 104 may collect audio in the conference site in real time, and transmit the collected audio information to the director device 105. The director device 105 may determine, based on the obtained video information and audio information, an object that needs to be shot at a current moment, and control, based on a location of the object that needs to be shot at the current moment, a shooting angle or a focal length of the director camera. The director camera 102 sends the collected video stream to the director device in real time. In addition, the director device 105 further determines that a video stream shot by which director camera needs to be sent to the another conference site currently, and sends a video stream of a determined director camera to the terminal device 106, so that the terminal device 106 sends the received video stream to the another conference site. If the terminal device 106 is a video playback device, the terminal device may play the received video stream locally.

In a process in which the director device 105 controls the director camera 102, the director device 105 may determine a current speaker based on information collected by the first camera 103 and the MIC array 104 at the current moment. The director device 105 further determines historical speech information based on information collected by the first camera 103 and the MIC array 104 in a historical time period. The director device 105 controls the director camera based on the current speaker and the historical speech information. The historical speech information may reflect information such as a speech mode of a participant and importance of the participant in the conference site. Therefore, the director device 105 may more precisely control the director camera based on the current speaker and the historical speech information, thereby avoiding frequent and unnecessary switching of the director camera.

Specific embodiments are used below to describe in detail example technical solutions. It should be noted that, the following specific embodiments may be combined with each other, and same or similar content is not repeatedly described in different embodiments.

Figure 2:
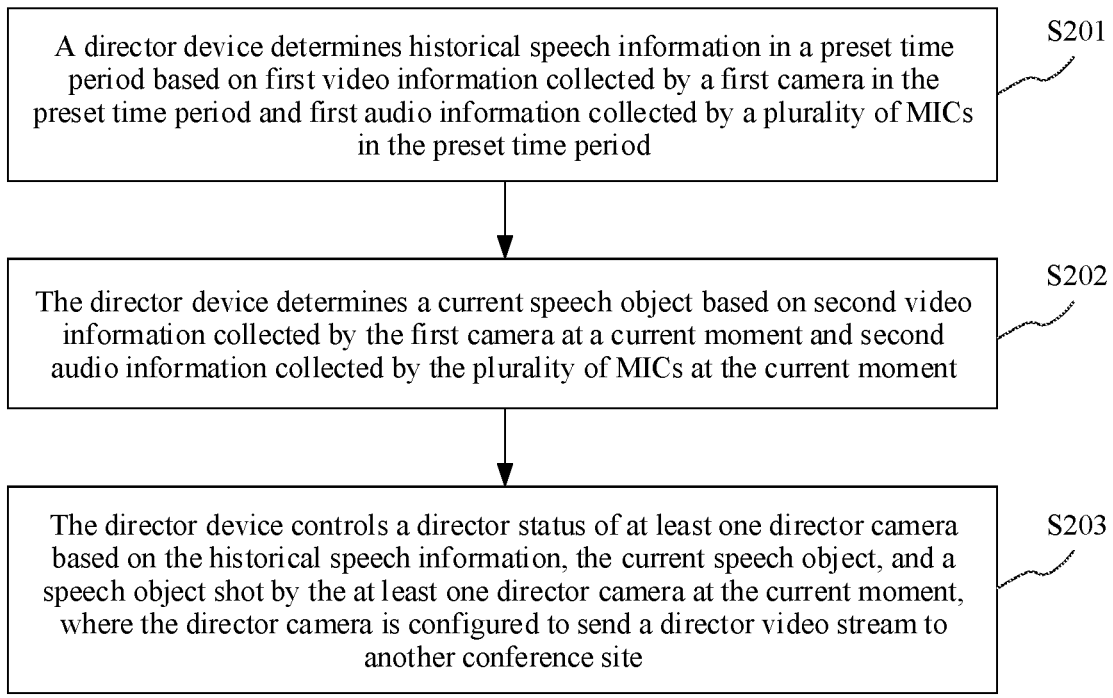
FIG. 2 is a schematic flowchart of an example non-limiting camera tracking method.

FIG. 2 is a schematic flowchart of a camera tracking method. Referring to FIG. 2, the method may include the following steps.

S201. A director device determines historical speech information in a preset time period based on first video information collected by a first camera in the preset time period and first audio information collected by a plurality of MICs in the preset time period, where the first camera is configured to collect a local video.

It should be noted that, for the director device, refer to the director device 105 in this embodiment in FIG. 1, for the first camera, refer to the first camera 103 in this embodiment in FIG. 1, and for the plurality of MICs, refer to the MIC array 104 in this embodiment in FIG. 1. Details are not described herein again.

The term "preset" as used herein means "set beforehand." A "preset time period" may be any length of time, and may be fixed, variable, predetermined and/or random. Optionally, the preset time period may be a time period before a current moment. For example, the preset time period may be 30 seconds, 1 minute, 5 minutes, 10 minutes, or the like before the current moment. Duration of the preset time period is not specifically limited in this application and can be any length from very short intervals such as 10 milliseconds or very long intervals such as several hours.

It should be noted that, preset time periods corresponding to different moments may also be different during a video conference. For example, not long after the beginning of the conference, the duration of the preset time period may be relatively short, and after the conference lasts for a relatively long time, the duration of the preset time period may be relatively long. For example, within one minute to five minutes after the conference begins, the duration of the preset time period may be one minute, and after five minutes after the conference begins, the duration of the preset time period may be five minutes. In an actual application process, the duration of the preset time period may be set based on an actual requirement.

Optionally, video information and audio information that are corresponding to moments in the preset time period may be obtained; speakers corresponding to the moments are determined based on the video information and the audio information that are corresponding to the moments in the preset time period; and the speakers corresponding to the moments are counted to obtain historical speech information. It should be noted that in an embodiment shown in FIG. 3, a method for determining a speaker corresponding to a moment is described in detail, and details are not described herein again.

Optionally, the historical speech information may be at least one piece of the following information: a quantity of speakers in the preset time period, speech duration of each speaker, speech content of each speaker, a quantity of speech times of each speaker, speech duration of each speech, a speech moment of each speech, a priority of each speaker, or any combination of these. In an actual application process, the content included in the historical speech information may be determined based on an actual requirement, and this is not specifically limited in this application.

S202. The director device determines a current speaker based on second video information collected by the first camera at the current moment and second audio information collected by the plurality of MICs at the current moment.

Optionally, the current speaker may be determined in the following feasible implementations: A horizontal angle and a vertical angle corresponding to each face image in the video information shot by the first camera at the current moment may be obtained; the audio information collected by the plurality of MICs at the current moment is obtained; a horizontal angle and a vertical angle corresponding to an acoustic source at the current moment are determined based on the audio information collected by the plurality of MICs at the current moment; and the current speaker that makes a speech at the current moment is determined based on the horizontal angle and the vertical angle corresponding to each face image, and the horizontal angle and the vertical angle corresponding to the acoustic source.

Figure 3:
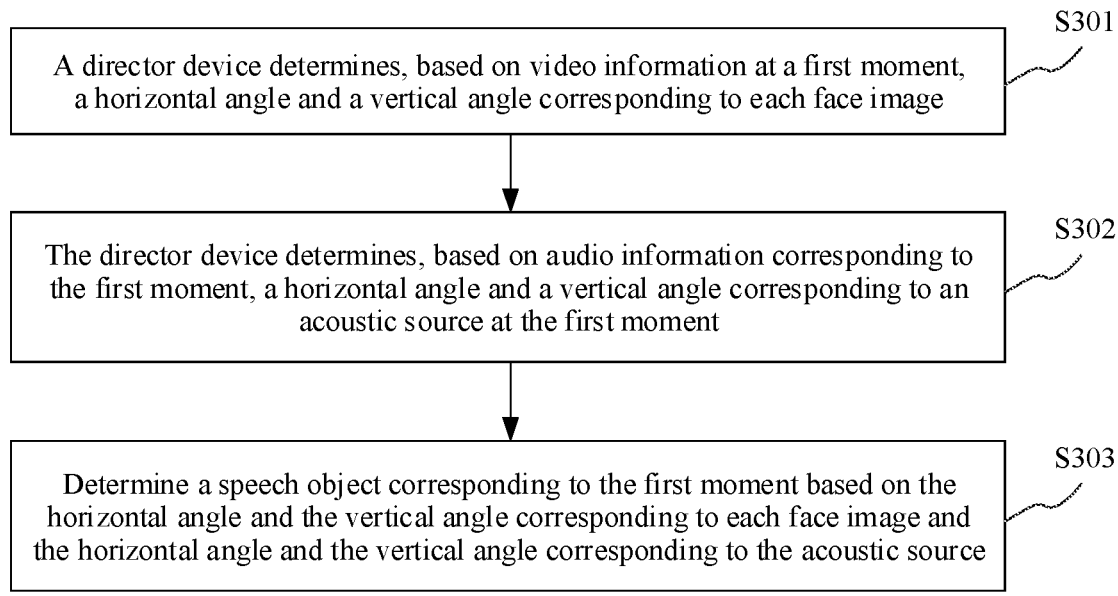
FIG. 3 is a schematic flowchart of an example non-limiting speaker determining method.

It should be noted that in this embodiment shown in FIG. 3, a method for determining the current speaker corresponding to the current moment is described in detail, and details are not described herein again.

S203. The director device controls a director status of at least one director camera based on the historical speech information, the current speaker, and a speaker shot by the at least one director camera at the current moment, where the director camera is configured to send a director video stream to another conference site.

A quantity of the at least one director camera may be one or more.

When there is one director camera, the director camera performs real-time shooting, and a video stream shot by the director camera is sent to the another conference site. Correspondingly, the speaker shot by the at least one director camera at the current moment is a speaker shot by the director camera at the current moment.

When there are a plurality of director cameras, all the plurality of director cameras perform real-time shooting. However, at a same moment, video streams shot by some pilot cameras may be sent to the another conference site. For example, video streams shot by only one director camera or two director cameras may be sent to the another conference site. Correspondingly, the speaker shot by the at least one director camera at the current moment is a speaker shot by a director camera whose video stream is sent to the another conference site at the current moment.

Optionally, a director status of a director camera includes a shooting angle of the director camera or a focal length of the director camera.

Optionally, it is assumed that the at least one director camera includes a first director camera and a second director camera, and at the current moment, a pilot video shot by the first director camera is sent to the another conference site. Correspondingly, the director status of the at least one director camera may be controlled in the following feasible implementations:

When the current speaker is the same as a speaker shot by the first director camera at the current moment, the director device keeps a shooting angle and a focal length of the first director camera unchanged. Optionally, in this case, the director device may also keep a shooting angle and a focal length of the second director camera unchanged. Certainly, the director device may also estimate a next speaker based on the historical speaker and the current speaker, and adjust the shooting angle and the focal length of the second director camera based on a location of the next speaker, so that a face image corresponding to the estimated next speaker is located at a target shooting location of the second director camera. Optionally, the target shooting location of the second director camera may be a central location of a camera lens of the second director camera, may be an upper middle location of the camera lens of the second director camera, or the like. In an actual application process, the target shooting location may be set based on an actual requirement, and this is not specifically limited.

When the current speaker is different from the speaker shot by the first director camera at the current moment, the director device adjusts the shooting angle or the focal length of at least one of the first director camera and the second director camera based on the historical speech information. Optionally, the director device may adjust only the shooting angle or the focal length of the second director camera. The director device may alternatively adjust both the shooting angles and the focal lengths of the first director camera and the second director camera. The director device may alternatively adjust only the shooting angle or the focal length of the first director camera. It should be noted that in an embodiment shown in FIG. 5A to FIG. 5C, a control process of the at least one director camera in this case is described in detail, and details are not described herein again.

According to the camera tracking method provided in this disclosure, in a video director process, the director device controls, based on the determined historical speech information in the preset time period, the current speaker, and the speaker shot by the at least one director camera at the current moment, the director status of the at least one director camera. The historical speech information may reflect information such as a speech mode of a participant in a conference site and importance or priority of the participant. Therefore, the director device may more precisely control the director camera based on the historical speech information, the current speaker, and the speaker shot by the at least one director camera at the current moment, thereby avoiding frequent and unnecessary switching of the director camera.

Based on this embodiment shown in FIG. 2, optionally, in S201, a speaker corresponding to each moment in the preset time period is determined in the process of determining the historical speech information. In S202, the current speaker corresponding to the current moment is determined. A process of determining the speaker corresponding to each moment in the preset time period is similar to the process of determining the current speaker corresponding to the current moment. A process of determining a speaker corresponding to a first moment (any moment in the preset time period or the current moment) is used as an example below to describe in detail a process of determining a speaker corresponding to a moment. For details, refer to this embodiment shown in FIG. 3. It should be noted that, in this embodiment shown in FIG. 3, that the first camera is a binocular camera is used as an example for description.

FIG. 3 is a schematic flowchart of a speaker determining method. Referring to FIG. 3, the method may include the following steps.

S301. A director device determines, based on video information at a first moment, a horizontal angle and a vertical angle corresponding to each face image.

With reference to a physical coordinate system shown in FIG. 4 and the following step A to step D, the horizontal angle and the vertical angle corresponding to each face image are determined below.

Figure 4:
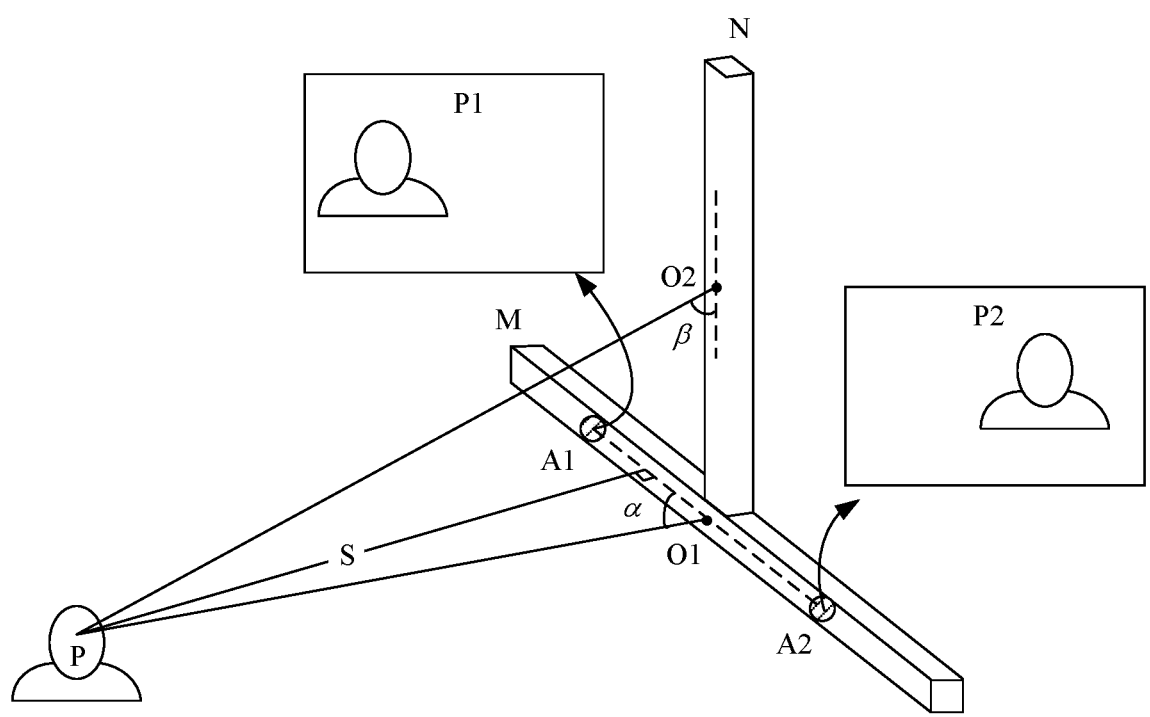
FIG. 4 is an example non-limiting physical coordinate system.

FIG. 4 is a physical coordinate system. Referring to FIG. 4, a camera support includes a horizontal support M and a vertical support N, the horizontal support M and the vertical support N are perpendicular to each other, and an intersection point between the horizontal support M and the vertical support N is a midpoint O1 of the horizontal support. The midpoint of the horizontal support M is O1, and a midpoint of the vertical support N is O2. A first camera disposed on the horizontal support M includes a camera lens A1 and a camera lens A2, and the camera lens A1 and the camera lens A2 are symmetrically disposed with respect to O1. In this application, a binocular coordinate system is a three-dimensional coordinate system (not shown). The binocular coordinate system may use the camera lens A1 as a coordinate origin, or may use the camera lens A2 as the coordinate origin.

Step A: Obtain two-dimensional coordinates of each face image in two camera lenses of the binocular camera.

Optionally, two-dimensional coordinates of a face image in a camera lens may be the two-dimensional coordinates of the face image in a picture shot by the camera lens. The binocular camera usually has two camera lenses, and there is a distance between the two camera lenses, so that when the two camera lenses shoot a same object, two-dimensional coordinates of the same object in the two camera lenses are different.

For example, referring to FIG. 4, the two camera lenses of the binocular camera are respectively the camera lens A1 and the camera lens A2. At a same moment, an image obtained by shooting an object P by the camera lens A1 may be shown as an image P1. In the image P1, a face image of the object P is located on a left side of the image P1. An image obtained by shooting the object P by the camera lens A2 may be shown as an image P2. In the image P2, a face image of the object P is located on a right side of the image P2. It may be learned from the foregoing that two-dimensional coordinates of the face image of the object P in the camera lens A1 and two-dimensional coordinates of the face image of the object P in the camera lens A2 are different.

Step B: Determine a depth of each face image based on the distance between the two camera lenses of the binocular camera and two-dimensional coordinates of each piece of face information in the two camera lenses.

A depth of a face image is a distance between a face and the binocular camera.

Referring to FIG. 4, the distance between the two camera lenses is a distance between the camera lens A1 and the camera lens A2. The depth of the face image is a distance between the object P and the horizontal support M. For example, a vertical line may be made to a straight line in which the horizontal support M is located by using the object P, to obtain a vertical intersection point, and a distance between the object P and the vertical intersection point is a depth s of the face image.

It should be noted that the depth of the face image shown in step B may be determined based on a formula in the prior art. Details are not described again in this application.

Step C: The director device determines three-dimensional coordinates of each face image in the binocular coordinate system based on the depth of each face image, where the binocular coordinate system is a three-dimensional coordinate system that uses one camera lens of the binocular camera as an origin.

Referring to FIG. 4, the binocular coordinate system may be a three-dimensional coordinate system that uses the camera lens A1 as a coordinate origin, or may be a three-dimensional coordinate system that uses the camera lens A2 as a coordinate origin.

It should be noted that the three-dimensional coordinates in step C may be determined based on a conventional formula known to those skilled in the art. Details are not described again in this application.

Step D: Determine, based on the three-dimensional coordinates of each face image in the binocular coordinate system, the horizontal angle and the vertical angle corresponding to each face image.

Referring to FIG. 4, the horizontal angle is an angle $\alpha$ between a straight line PO1 and the horizontal support, and the vertical angle is an angle $\beta$ between PO2 and the vertical support.

Optionally, the horizontal angle $\alpha$ corresponding to the face image may be determined by using Formula 1:

$$\alpha = \arctan\left(\frac{\sqrt{y^2 + z^2}}{|x - dx|}\right) \quad \text{Formula 1}$$

Herein, (x, y, z) is the three-dimensional coordinates of the face image in the binocular coordinate system, and dx is a distance between a camera lens and the midpoint of the horizontal support. For example, referring to FIG. 4, dx is a distance between A1 and O1.

Optionally, the vertical angle $\beta$ corresponding to the face image may be determined by using Formula 2:

$$\beta = \arctan\left(\frac{\sqrt{(x - dx)^2 + z^2}}{|y + dy|}\right) \quad \text{Formula 2}$$

Herein, (x, y, z) is the three-dimensional coordinates of the face image in the binocular coordinate system, and dy is half a length of the vertical support. For example, referring to FIG. 4, dy may be a distance between O1 and O2.

S302. The director device determines, based on audio information corresponding to the first moment, a horizontal angle and a vertical angle corresponding to an acoustic source at the first moment.

In this application, the plurality of MICs are disposed on different locations of the camera support. Therefore, for a same acoustic source, audio information collected by different MICs is different. For example, for a same acoustic source, amplitude or phase of audio information collected by different MICs is different.

It should be noted that, the horizontal angle and the vertical angle corresponding to the acoustic source at the first moment may be determined according to a conventional method known to those skilled in the art. Details are not described again in this application.

S303. Determine a speaker corresponding to the first moment based on the horizontal angle and the vertical angle corresponding to each face image and the horizontal angle and the vertical angle corresponding to the acoustic source.

Optionally, the speaker corresponding to the first moment may be determined in the following feasible implementations:

determining, based on the horizontal angle and the vertical angle corresponding to each face image, and the horizontal angle and the vertical angle corresponding to the acoustic source, a distance between a face corresponding to each face image and the acoustic source, and determining, based on the distance between the face corresponding to each face image and the acoustic source, the speaker corresponding to the first moment.

Optionally, a distance between a face and an acoustic source may be determined by using Formula 3:

$$h = \sqrt{(\alpha - \alpha_1)^2 + (\beta - \beta_1)^2} \quad \text{Formula 3}$$

Herein, $\alpha$ is a horizontal angle corresponding to a face image; $\beta$ is a vertical angle corresponding to the face image; $\alpha_1$ is a horizontal angle corresponding to an acoustic source; and $\beta_1$ is a vertical angle corresponding to the acoustic source.

In this embodiment shown in FIG. 3, when the speaker corresponding to the first moment is determined, the speaker is determined with reference to the video information shot by the binocular camera at the first moment and the audio information collected by the plurality of MICs at the first moment. An approximate location of the speaker may be preliminarily determined based on the audio information collected by the plurality of MICs at the first moment. Further, a location of a face at the conference site may be accurately determined based on the video information shot by the binocular camera at the first moment. Therefore, the speaker can be precisely determined with reference to the video information and the audio information.

Based on any one of the foregoing embodiments, with reference to an embodiment shown in FIG. 5A to FIG. 5C, an example in which a director camera includes a first director camera and a second director camera, and a pilot video shot by the first director camera is sent to another conference site at a current moment is used below to describe a control process of the director camera in detail.

It should be noted that when the director device determines that a current speaker is the same as a speaker shot by the first director camera at the current moment, the director camera does not need to be adjusted. When the director device determines that the current speaker is different from the speaker shot by the first director camera at the current moment, the director camera may need to be adjusted. In this embodiment shown in FIG. 5A to FIG. 5C, an adjustment process of the director camera is described only when the current speaker is different from the speaker shot by the first director camera at the current moment.

Figure 5A:
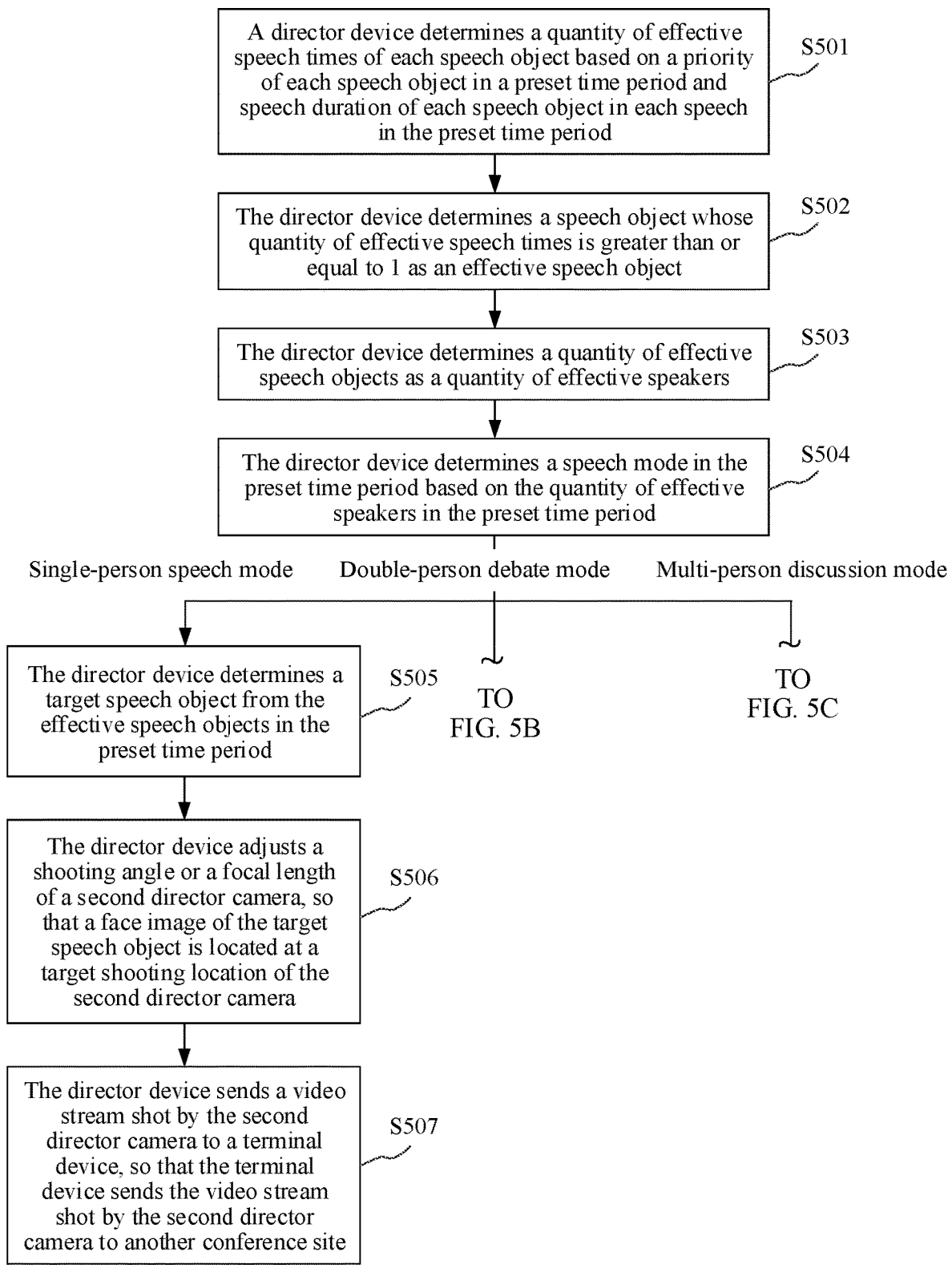
FIG. 5A to FIG. 5C are a schematic flowchart of an example non-limiting director camera controlling method.
Figure 5B:
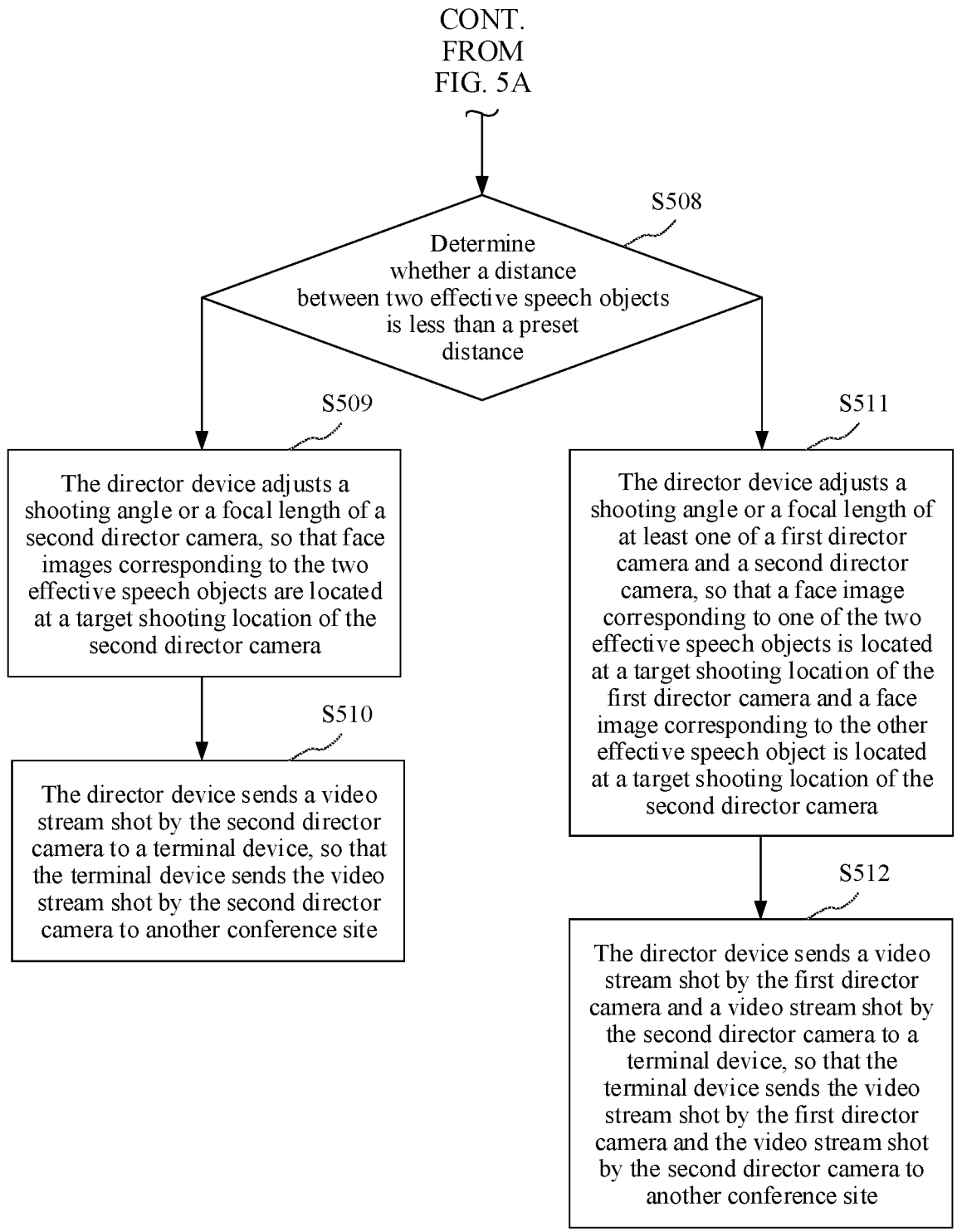
Figure 5C:
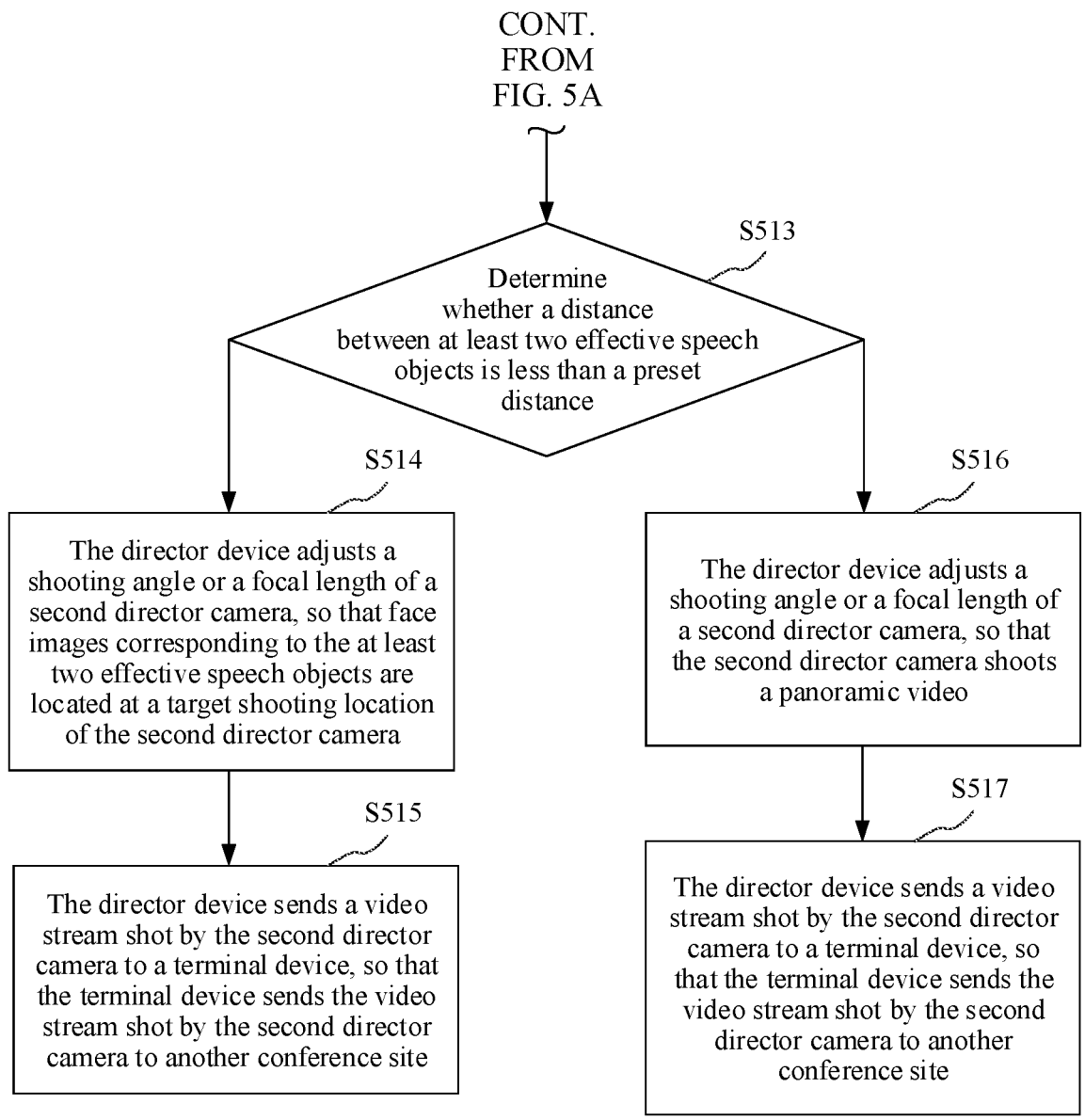

FIG. 5A to FIG. 5C are a schematic flowchart of a director camera controlling method according to this application. Referring to FIG. 5A to FIG. 5C, the method may include the following steps.

S501. A director device determines a quantity of effective speech times of each speaker based on a priority of each speaker in a preset time period and speech duration of each speaker in each speech in the preset time period.

In this application, each participant in a conference site corresponds to a priority.

Optionally, a priority of a participant may be preset by an administrator in the director device. For example, the administrator may determine a priority of each participant based on an identity of a participant in this conference or a job of the participant, and import information about the participant (for example, face information or a sound feature) and a corresponding priority to the director device. In this way, in a conference process, the director device can determine the priority of the participant based on collected video information or audio information.

Optionally, at the beginning of the conference, the director device may determine a seat of each participant in the conference site based on video information shot by a first camera, and determine a priority for each participant based on a seat of a participant in the conference site, and a seat in the conference site has a preset priority. For example, in one scenario, a participant sitting in a central location of the conference site has a highest priority, and a participant sitting farther from the central location of the conference site has a lower priority.

During the conference, the director device may further update a priority of a participant based on a speech status of each participant. For example, when a quantity of speech times of a participant is relatively large, or speech duration of a participant is relatively long, a priority of the participant may be increased. When a quantity of speech times of a participant is relatively small, or speech duration of a participant is relatively short, a priority of the participant may be reduced. When speech content of a participant includes a preset keyword (for example, "colleagues", "everyone", "come on", or "make an effort"), a priority of the participant may be increased. In an actual application process, a priority of a participant may be further updated based on other content.

Optionally, different priorities correspond to different effective speech duration thresholds. A higher priority indicates a lower effective speech duration threshold. When speech duration of a speaker in a speech is greater than an effective speech duration threshold corresponding to a priority of the speaker, this speech can be determined as an effective speech.

Optionally, for any first speaker in the preset time period, when a quantity of effective speech times of the first speaker needs to be obtained, a priority of the first speaker in the preset time period is first obtained, and an effective speech duration threshold corresponding to the priority is obtained. In addition, speech duration of the first speaker in each speech in the preset time period is obtained, and a quantity of speech times of the first speaker whose the speech duration is greater than the effective speech duration threshold is obtained. The quantity of speech times is the quantity of effective speech times.

It should be noted that, in an actual application process, an effective speech duration threshold corresponding to a priority may be set based on an actual requirement.

S502. The director device determines a speaker whose quantity of effective speech times is greater than or equal to 1 as an effective speaker.

Optionally, if a quantity of effective speech times of a speaker is greater than 1, the speaker may be determined as the effective speaker.

S503. The director device determines a quantity of effective speakers as a quantity of effective speakers.

After determining whether each speaker is the effective speaker, the director device may count the quantity of effective speakers to determine the quantity of effective speakers.

It should be noted that, the director device may determine the quantity of effective speakers in the preset time period by using S501 to S503. In an actual application process, the director device may alternatively determine the quantity of effective speakers in another feasible implementation.

S504. The director device determines a speech mode in the preset time period based on the quantity of effective speakers in the preset time period.

Optionally, the speech mode includes at least one of a single-person speech mode, a double-person debate mode, or a multi-person discussion mode. The speech mode may further include another mode, such as a three-person debate mode.

Optionally, when the quantity of effective speakers is different, a speech mode determining method is also different. The method may include at least the following three possible implementations:

In a first possible implementation, the quantity of effective speakers is 1.

In this possible implementation, because there is only one effective speaker in the preset time period, the director device may determine that the speech mode in the preset time period is the single-person speech mode.

In a second possible implementation, the quantity of effective speakers is 2.

In this possible implementation, when a quantity of effective speeches is 2, it indicates that there are two effective speakers in the preset time period. If the two effective speakers speak alternately and a quantity of alternate times is relatively large, it can be determined that the two effective speakers are debating. In this case, it can be determined that the speech mode is the double-person debate mode. If the two effective speakers do not speak alternately, the speech mode is the single-person speech mode.

In a third possible implementation, the quantity of effective speakers is greater than 2.

In this possible implementation, the director device determines, based on priorities of at least two effective speakers in the preset time period, that the speech mode in the preset time period is the single-person speech mode or the multi-person discussion mode.

Optionally, it may be determined, based on the priorities of the at least two effective speakers, whether the at least two effective speakers include an important speaker. A priority of the important speaker may be a preset priority, or the priority of the important speaker is higher than a preset priority.

If the at least two effective speakers include the important speaker, the director device may determine that the speech mode in the preset time period is the single-person speech mode. If the at least two effective speakers do not include the important speaker, the director device may determine that the speech mode in the preset time period is the multi-person discussion mode.

After the director device determines the speech mode in the preset time period, the director device adjusts a shooting angle or a focal length of at least one of a first director camera and a second director camera based on the speech mode in the preset time period. When the speech mode is different, a process of adjusting the director camera is also different.

Optionally, when the speech mode is the single-person speech mode, the director camera may be adjusted by using S505 to S507. When the speech mode is the double-person debate mode, the director camera may be adjusted by using S508 to S512. When the speech mode is the multi-person discussion mode, the director camera may be adjusted by using S513 to S517.

S505. The director device determines a target speaker from the effective speakers in the preset time period.

In this application, regardless of a quantity of speakers in the preset time period, the speech mode in the preset time period may be determined as the single-person speech mode. Correspondingly, when the speech mode is the single-person speech mode, manners of determining the target speaker are also different based on different quantity of effective speakers in the preset time period. Specifically, the manners may include at least the following three possible implementations.

In a first possible implementation, a quantity of the effective speakers in the preset time period is 1.

In this possible implementation, one effective speaker in the preset time period may be determined as the target speaker.

In a second possible implementation, a quantity of the effective speakers in the preset time period is 2.

In this possible implementation, the target speaker may be determined in the two effective speakers based on priorities of the two effective speakers. For example, an effective speaker with a higher priority in the two effective speakers may be determined as the target speaker.

In a third possible implementation, a quantity of the effective speakers in the preset time period is greater than 2.

In this possible implementation, an important speaker may be determined based on a priority of an effective speaker in the preset time period, and the important speaker is determined as the target speaker.

It should be noted that, in an actual application process, the target speaker may alternatively be determined in another feasible implementation.

S506. The director device adjusts the shooting angle or the focal length of the second director camera, so that a face image of the target speaker is located at a target shooting location of the second director camera.

At a current moment, a video stream shot by the first director camera is transmitted to another conference site. When the speech mode is the single-person speech mode, the second director camera may be adjusted to avoid a zooming and shifting process of an image in the video stream transmitted to the another conference site. In a process of adjusting the second director camera, the video stream shot by the first director camera is still transmitted to the another conference site.

It should be noted that, if video streams shot by both the first director camera and the second director camera are transmitted to the another conference site at the current moment, in this case, any one director camera can be adjusted, or a director camera that needs to be adjusted with relatively small amplitude is adjusted.

Optionally, step A to step D may be used to adjust the shooting angle or the focal length of the second director camera.

Step A: The director device obtains three-dimensional coordinates of the target speaker in a binocular coordinate system.

It should be noted that for a performing process of step A, refer to step A to step C in S301. Details are not described herein again.

Step B: The director device determines three-dimensional coordinates of the target speaker in a director coordinate system based on an external parameter between a binocular camera (the first camera) and the second director camera.

The director coordinate system is a three-dimensional coordinate system that uses an initial location of the second director camera as an origin.

Optionally, the external parameter between the binocular camera and the second director camera includes a distance between the binocular camera and the second director camera, and the like.

Step C: The director device determines two-dimensional coordinates of the target speaker in a camera lens of the second director camera based on the three-dimensional coordinates of the target speaker in the director coordinate system.

Step D: Based on a distance between the target speaker and the second director camera, the two-dimensional coordinates of the target speaker in the camera lens of the second director camera, and a target location that needs to be reached, calculate the focal length of the second director camera, and a horizontal angle and a vertical angle that the second director camera needs to be rotated.

It should be noted that, after the second director camera is adjusted by using step A to step D, it may be further determined whether a face shot by the second director camera is located at the target location of the lens. If the face is not located at the target location of the lens, fine adjustment is performed on the second director camera until the face image of the target speaker is at the target shooting location of the second director camera.

Figure 6A:
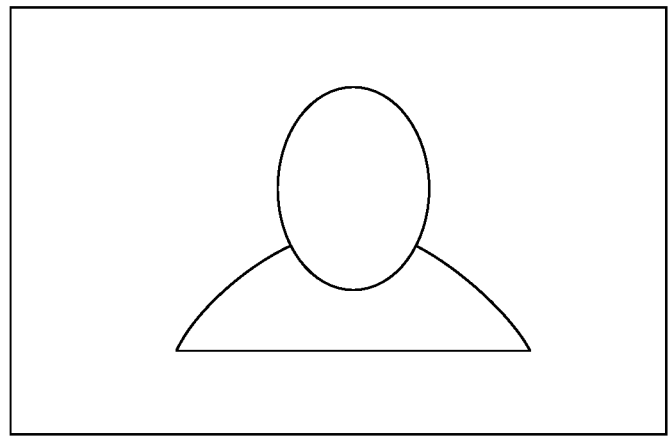
FIG. 6A is a schematic diagram 1 of an example non-limiting video image.

With reference to FIG. 6A, an image in a video shot by the second director camera is described below.

FIG. 6A is a schematic diagram 1 of a video image according to this application. Referring to FIG. 6A, the video image includes one speaker, and the effective speaker is located at a target location of the image. For example, the target location is a central location of the image.

S507. The director device sends the video stream shot by the second director camera to a terminal device, so that the terminal device sends the video stream shot by the second director camera to the another conference site.

After the director device sends the video stream shot by the second director camera to the terminal device, the terminal device sends the received video stream to the another conference site.

S508. Determine whether a distance between the two effective speakers in the preset time period is less than a preset distance.

S509 and S510 are performed if the distance between the two effective speakers in the preset time period is less than the preset distance.

S511 and S512 are performed if the distance between the two effective speakers in the preset time period is not less than the preset distance.

S509. The director device adjusts the shooting angle or the focal length of the second director camera, so that face images corresponding to the two effective speakers are located at the target shooting location of the second director camera.

It should be noted that for a process of performing S509, refer to S506, and details are not described herein again.

Figure 6B:
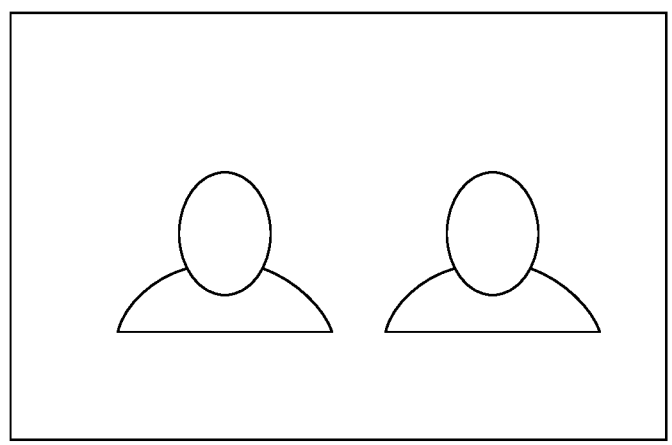
FIG. 6B is a schematic diagram 2 of an example non-limiting video image.

With reference to FIG. 6B, an image in a video shot by the second director camera is described below.

FIG. 6B is a schematic diagram 2 of a video image according to this application. Referring to FIG. 6B, the video image includes two effective speakers, and the two effective speakers are located at a central position of the image.

S510. The director device sends the video stream shot by the second director camera to the terminal device, so that the terminal device sends the video stream shot by the second director camera to the another conference site.

It should be noted that for a process of performing S510, refer to S507, and details are not described herein again.

S511. The director device adjusts the shooting angle or the focal length of at least one of the first director camera and the second director camera, so that a face image corresponding to one of the two effective speakers is located at a target shooting location of the first director camera and a face image corresponding to the other effective speaker is located at the target shooting location of the second director camera.

It should be noted that for a process of adjusting the first director camera or the second director camera, refer to S506. Details are not described herein again.

S512. The director device sends the video stream shot by the first director camera and the video stream shot by the second director camera to the terminal device, so that the terminal device sends the video stream shot by the first director camera and the video stream shot by the second director camera to the another conference site.

After the terminal device receives the video stream shot by the first director camera and the video stream shot by the second director camera, the terminal device sends both the video stream shot by the first director camera and the video stream shot by the second director camera to the another conference site, so that the video streams that are shot by the first director camera and the second director camera can be simultaneously played or presented at the another conference site.

Optionally, before sending the video stream shot by the first director camera and the video stream shot by the second director camera to the terminal device, the director device may further combine the video stream shot by the first director camera and the video stream shot by the second director camera, and send a combined video stream to the terminal device.

Optionally, before the terminal device sends, to the another conference site, the video streams that are shot by the first director camera and the second director camera, the terminal device may first combine the video streams that are shot by the first director camera and the second director camera, and then send the combined video stream to the another conference site.

Figure 6C:
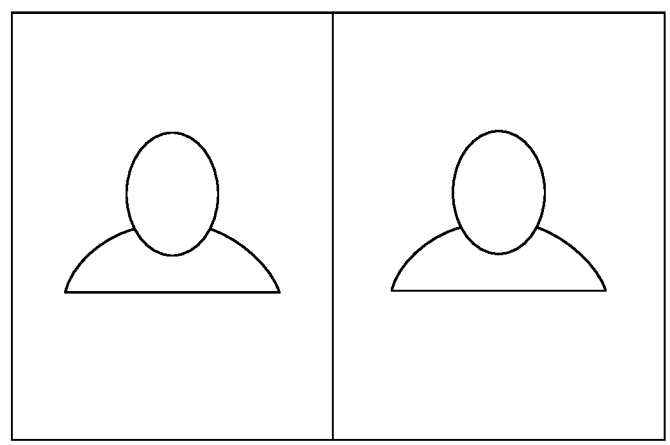
FIG. 6C is a schematic diagram 3 of an example non-limiting video image.

With reference to FIG. 6C, an image in a video shot by the second director camera is described below.

FIG. 6C is a schematic diagram 3 of a video image according to this application. Referring to FIG. 6C, the video image includes two effective speakers, the two effective speakers are respectively shot by the first director camera and the second director camera, and images corresponding to the two effective speakers are combined by the terminal device.

S513. The director device determines whether a distance between the at least two effective speakers is less than the preset distance.

S514 and S515 are performed if the distance between the at least two effective speakers is less than the preset distance.

S516 and S517 are performed if the distance between the at least two effective speakers is not less than the preset distance.

Optionally, the director device may determine a distance between two effective speakers that are farthest away as the distance between the at least two effective speakers.

S514. The director device adjusts the shooting angle or the focal length of the second director camera, so that face images corresponding to the at least two effective speakers are located at the target shooting location of the second director camera.

It should be noted that for a process of performing S514, refer to S506, and details are not described herein again.

Figure 6D:
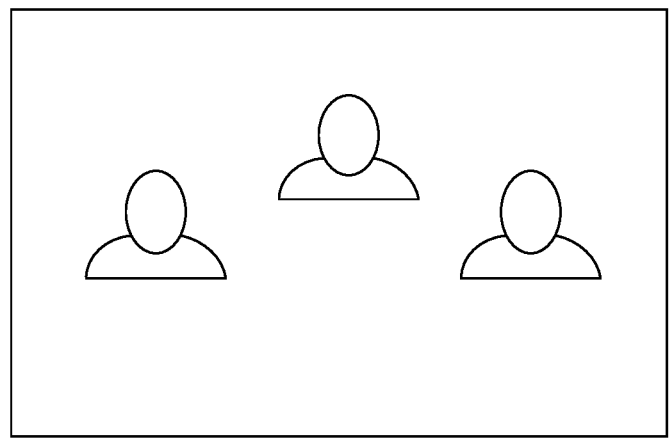
FIG. 6D is a schematic diagram 4 of an example non-limiting video image.

With reference to FIG. 6D, an image in a video shot by the second director camera is described below.

FIG. 6D is a schematic diagram 4 of a video image according to this application. Referring to FIG. 6D, it is assumed that a quantity of the at least two speakers are three.

In this case, the video image includes three effective speakers, and the three effective speakers are located at a central location of the image.

S515. The director device sends the video stream shot by the second director camera to the terminal device, so that the terminal device sends the video stream shot by the second director camera to the another conference site.

It should be noted that for a process of performing S515, refer to S507, and details are not described herein again.

S516. The director device adjusts the shooting angle or the focal length of the second director camera, so that the second director camera shoots a panoramic video.

It should be noted that for a process of performing S516, refer to S506, and details are not described herein again.

Figure 6E:
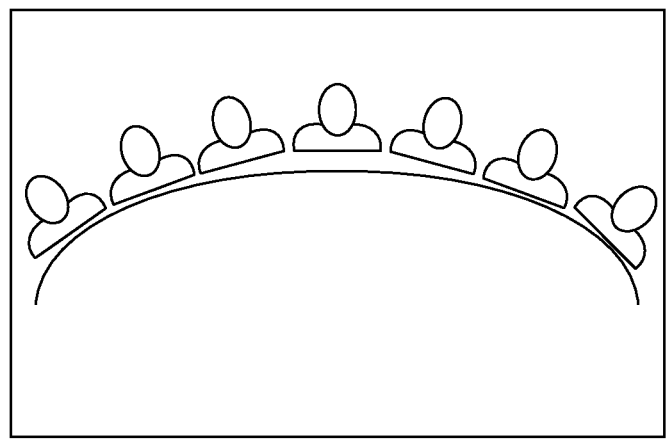
FIG. 6E is a schematic diagram 5 of an example non-limiting video image.

With reference to FIG. 6E, an image in a video shot by the second director camera is described below.

FIG. 6E is a schematic diagram 5 of a video image according to this application. Referring to FIG. 6E, the video image shot by the second director camera is a panoramic image, and the panoramic image includes face images of all participants in the conference site.

S517. The director device sends the video stream shot by the second director camera to the terminal device, so that the terminal device sends the video stream shot by the second director camera to the another conference site.

It should be noted that for a process of performing S517, refer to S507, and details are not described herein again.

In this embodiment shown in FIG. 5A to FIG. 5C, the director device determines the speech mode based on historical speech information in the preset time period, and controls the director camera based on the speech mode. The speech mode in the preset time period may reflect a real scenario of the conference, and accurate control may be performed on the director camera based on the real scenario of the conference, thereby avoiding frequent and unnecessary switching of the director camera.

Figure 7:
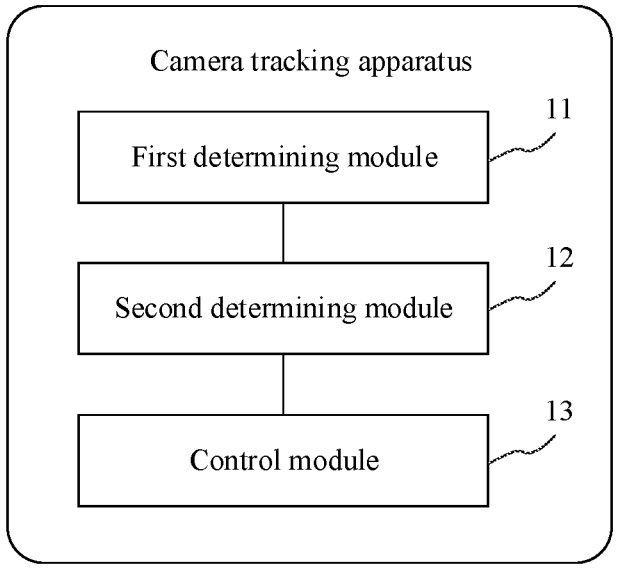
FIG. 7 is a schematic structural diagram 1 of an example non-limiting camera tracking apparatus.

FIG. 7 is a schematic structural diagram 1 of a camera tracking apparatus according to this application. The camera tracking apparatus may be disposed on the director device shown in the embodiment in FIG. 1. Referring to FIG. 7, the apparatus may include a first determining module/function 11, a second determining module/function 12, and a control module/function 13, as described above.

The first determining module/function 11 is configured to determine historical speech information in a preset time period based on first video information collected by a first camera in the preset time period and first audio information collected by a plurality of microphones MICs in the preset time period, where the first camera is configured to collect a local video.

The second determining module/function 12 is configured to determine a current speaker based on second video information collected by the first camera at a current moment and second audio information collected by the plurality of MICs at the current moment.

The control module/function 13 is configured to control a director status of at least one director camera based on the historical speech information, the current speaker, and a speaker shot by the at least one director camera at the current moment, where the director camera is configured to send a director video stream to another conference site.

The camera tracking apparatus may execute the technical solution shown in the foregoing method embodiments. An implementation principle and a beneficial effect of the camera tracking apparatus are similar to those of the foregoing method embodiments, and details are not described herein again.

In a possible implementation, a director status of a director camera includes a shooting angle or a focal length, and the at least one director camera includes a first director camera and a second director camera. The control module/function 13 is specifically configured to:

when the current speaker is the same as a speaker shot by the first director camera at the current moment, keep a shooting angle and a focal length of the first director camera unchanged, where a pilot video shot by the first director camera is sent to the another conference site at the current moment; or when the current speaker is different from a speaker shot by the first director camera at the current moment, adjust a shooting angle or a focal length of at least one of the first director camera and the second director camera based on the historical speech information.

Figure 8:
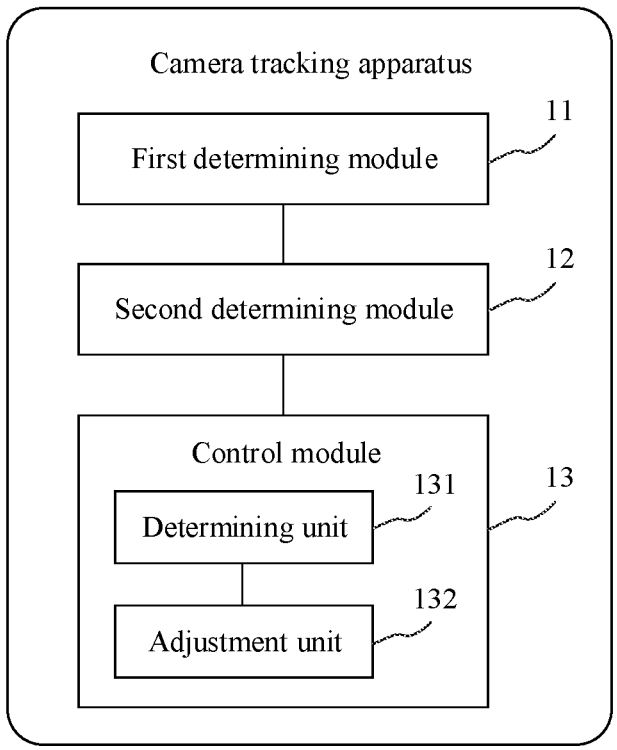
FIG. 8 is a schematic structural diagram 2 of an example non-limiting camera tracking apparatus.

FIG. 8 is a schematic structural diagram 2 of a camera tracking apparatus according to this application. Based on this embodiment shown in FIG. 7, referring to FIG. 8, the control module/function 13 includes a determining unit 131 and an adjustment unit 132 as described above.

The determining unit 131 is configured to: when the current speaker is different from the speaker shot by the first director camera at the current moment, determine a speech mode in the preset time period based on the historical speech information, where the speech mode includes at least one of a single-person speech mode, a double-person debate mode, or a multi-person discussion mode.

The adjustment unit 132 is configured to adjust the shooting angle or the focal length of at least one of the first director camera and the second director camera based on the speech mode in the preset time period.

In another possible implementation, the determining unit 131 is specifically configured to:

determine a quantity of effective speakers in the preset time period based on the historical speech information; and determine the speech mode in the preset time period based on the quantity of effective speakers in the preset time period.

In another possible implementation, the determining unit 131 is specifically configured to:

determine a quantity of effective speech times of each speaker based on a priority of each speaker in the preset time period and speech duration of each speaker in each speech in the preset time period;

determine a speaker whose quantity of effective speech times is greater than or equal to 1 as an effective speaker; and determine a quantity of the effective speakers as the quantity of effective speakers.

In another possible implementation, the determining unit 131 is specifically configured to:

when the quantity of effective speakers is 1, determine that the speech mode in the preset time period is the single-person speech mode;

when the quantity of effective speakers is 2, if the two effective speakers speak alternately, determine that the speech mode in the preset time period is the single-person speech mode or the double-person debate mode; or when the quantity of effective speakers is greater than 2, determine, based on priorities of at least two effective speakers in the preset time period, that the speech mode in the preset time period is the single-person speech mode or the multi-person discussion mode.

In another possible implementation, the determining unit 131 is specifically configured to:

if the at least two effective speakers include an important speaker, determine that the speech mode in the preset time period is the single-person speech mode; or if the at least two effective speakers do not include an important speaker, determine that the speech mode in the preset time period is the multi-person discussion mode.

In another possible implementation, the speech mode is the single-person speech mode; and the adjustment unit 132 is specifically configured to:

determine a target speaker from the effective speakers in the preset time period; and adjust the shooting angle or the focal length of the second director camera, so that a face image of the target speaker is located at a target shooting location of the second director camera.

In another possible implementation, the adjustment unit 132 is specifically configured to:

when the quantity of effective speakers in the preset time period is 1, determine one effective speaker in the preset time period as the target speaker;

when the quantity of effective speakers in the preset time period is 2, determine the target speaker from the two effective speakers based on priorities of the two effective speakers; or when the quantity of effective speakers in the preset time period is greater than 2, determine an important speaker in the preset time period as the target speaker.

In another possible implementation, the speech mode is the double-person debate mode; and the adjustment unit 132 is specifically configured to:

if a distance between two effective speakers in the preset time period is less than a preset distance, adjust the shooting angle or the focal length of the second director camera, so that face images corresponding to the two effective speakers are located at a target shooting location of the second director camera; or if a distance between two effective speakers in the preset time period is greater than or equal to a preset distance, adjust the shooting angle or the focal length of at least one of the first director camera and the second director camera, so that a face image corresponding to one of the two effective speakers is located at a target shooting location the first director camera and a face image corresponding to the other effective speaker is located at a target shooting location of the second director camera.

In another possible implementation, the speech mode is the multi-person discussion mode; and the adjustment unit 132 is specifically configured to:

if a distance between at least two effective speakers in the preset time period is less than a preset distance, adjust the shooting angle or the focal length of the second director camera, so that face images corresponding to the at least two effective speakers are located at a target shooting location of the second director camera; or if a distance between at least two effective speakers in the preset time period is greater than or equal to a preset distance, adjust the shooting angle or the focal length of the second director camera, so that the second director camera shoots a panoramic video.

In another possible implementation, the apparatus further includes a sending module/function 14. Sending module/function 14 may comprise a processor, software executed by a processor, hardware circuitry, or any combination thereof. In one embodiment, sending module/function 14 may comprise a communications interface that transmits information wirelessly and/or over a wire using a conventional communications protocol such as a compression-based digital video and audio standard such as H.264.

The sending module/function 14 is configured to: after the adjustment unit 132 adjusts the shooting angle or the focal length of the second director camera, send a video stream shot by the second director camera to a terminal device, so that the terminal device sends the video stream shot by the second director camera to the another conference site.

In another possible implementation, the sending module/function 14 is further configured to:

after the adjustment unit 132 adjusts the shooting angle or the focal length of at least one of the first director camera and the second director camera, send a video stream shot by the first director camera and a video stream shot by the second director camera to a terminal device, so that the terminal device sends the video stream shot by the first director camera and the video stream shot by the second director camera to the another conference site.

In another possible implementation, the first determining module/function 11 is specifically configured to:

determine, based on video information and audio information that are corresponding to moments in the preset time period, speakers corresponding to the moments; and collect statistics about the speakers corresponding to the moments to obtain the historical speech information, where the historical speech information includes at least one piece of the following information: a quantity of speakers in the preset time period, speech duration of each speaker, a quantity of speech times of each speaker, speech content of each speaker, speech duration of each speech, a speech moment of each speech, or a priority of each speaker.

In another possible implementation, for a first moment in the preset time period, the first determining module/function 11 is specifically configured to:

determine, based on video information at the first moment, a horizontal angle and a vertical angle corresponding to each face image;

determine, based on audio information corresponding to the first moment, a horizontal angle and a vertical angle corresponding to an acoustic source at the first moment; and determine a speaker corresponding to the first moment based on the horizontal angle and the vertical angle corresponding to each face image and the horizontal angle and the vertical angle corresponding to the acoustic source.

In another possible implementation, the first camera is a binocular camera; and the first determining module/function 11 is specifically configured to:

obtain two-dimensional coordinates of each face image in two camera lenses of the binocular camera based on the video information at the first moment;

determine a depth of each face image based on a distance between the two camera lenses of the binocular camera and the two-dimensional coordinates of each piece of face information in the two camera lenses, where a depth of a face image is a distance between a face and the binocular camera;

determine three-dimensional coordinates of each face image in a binocular coordinate system based on the depth of each face image, where the binocular coordinate system is a three-dimensional coordinate system that uses one camera lens of the binocular camera as an origin; and determine, based on the three-dimensional coordinates of each face image in the binocular coordinate system, the horizontal angle and the vertical angle corresponding to each face image.

In another possible implementation, the first determining module/function 11 is specifically configured to:

determine, based on the horizontal angle and the vertical angle corresponding to each face image and the horizontal angle and the vertical angle corresponding to the acoustic source, a distance between a face corresponding to each face image and the acoustic source; and determine, based on the distance between the face corresponding to each face image and the acoustic source, the speaker corresponding to the first moment.

The camera tracking apparatus may execute the technical solution shown in the foregoing method embodiments. An implementation principle and a beneficial effect of the camera tracking apparatus are similar to those of the foregoing method embodiments, and details are not described herein again.

Figure 9:
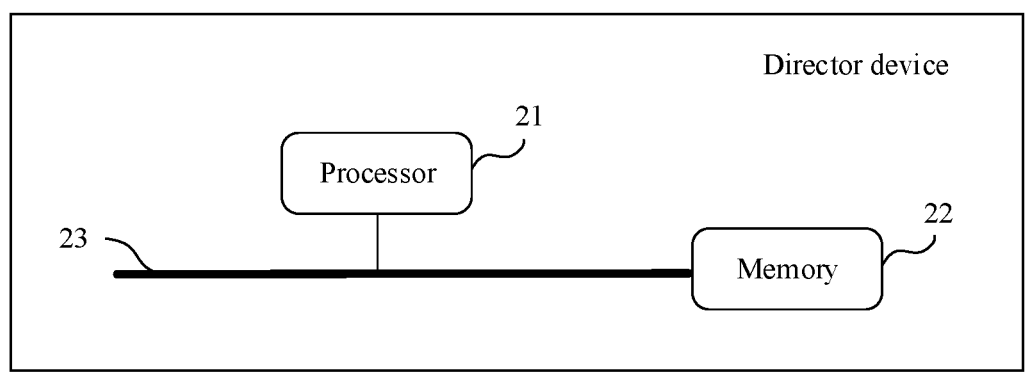
FIG. 9 is a schematic structural diagram of an example non-limiting director device.

FIG. 9 is a schematic structural diagram of a director device. Referring to FIG. 9, the director device includes a processor 21, a memory 22, and a communications bus 23. The communications bus 23 is configured to implement connections between components. The memory 22 is configured to store a program instruction. The processor 21 is configured to: read the program instruction in the memory 22, and perform, based on the program instruction in the memory 22, the technical solution shown in the foregoing method embodiments.

The director device may execute the technical solution shown in the foregoing method embodiments. An implementation principle and a beneficial effect of the director device are similar to those of the foregoing method embodiments, and details are not described herein again.

This application provides a non-transitory computer-readable storage medium. The computer-readable storage medium stores a computer executable instruction(s). When at least one processor of a storage device executes the computer executable instruction(s), the storage device performs the camera tracking method provided in the foregoing possible designs.

This application provides a computer program product. The computer program product includes a computer executable instruction(s). The computer executable instruction(s) is/are stored in a non-transitory computer-readable storage medium. At least one processor of a storage device may read the computer executable instruction from the computer-readable storage medium. The at least one processor executes the computer executable instruction, so that the storage device is enabled to implement the camera tracking method provided in the possible designs in the foregoing method embodiments.

This application provides a chip system. The chip system includes a processor, configured to support a director device in implementing a function in the foregoing aspects, for example, processing information in the foregoing method. In a possible design, the chip system further includes a memory, and the memory is configured to store a program instruction and data required by the director device. The chip system may include a chip, or may include a chip and another discrete device.

Persons of ordinary skill in the art will understand that all or some of the steps of the method embodiments may be implemented by a program instructing related hardware. The program may be stored in a non-transitory computer-readable storage medium. When the program runs, the steps of the method embodiments are performed. The foregoing storage medium includes: any medium that can store program code, such as a ROM, a RAM, a magnetic disk, or an optical disc.

What is claimed is:

1. A camera tracking method, comprising:
determining historical speech information of a speaker in a past time period based on first video information collected by a first camera in the past time period and first audio information collected by a plurality of microphones (MICs) in the past time period;
determining a current speaker based on second video information currently collected by the first camera and second audio information currently collected by the plurality of MIC5; and
controlling a director status of director cameras based on the speech information of a speaker, the current speaker, and a speaker the image of whom is currently captured by at least one director camera, wherein
the director status of a director camera comprises a shooting angle or a focal length, and wherein when the current speaker is different from the speaker shot by the first director camera at the current moment, the director device adjusts the shooting angle or the focal length of at least one of the first director camera and a second director camera based on the historical speech information,
wherein the at least one director camera is configured to send a director video stream to a conference site.

2. The method according to claim 1, wherein:
the controlling the director status further comprises:
when the current speaker is the same as a speaker shot by the first director camera at the current moment, keeping a shooting angle and a focal length of the first director camera unchanged, wherein a pilot video shot by the first director camera is sent to the another conference site at the current moment.

3. The method according to claim 1, wherein
when the current speaker is different from the speaker shot by the first director camera at the current moment, determining a speech mode in a preset past time period based on the speech information of the speaker, wherein the speech mode comprises at least one of a single-person speech mode, a double-person debate mode, or a multi-person discussion mode; and
adjusting the shooting angle or the focal length of at least one of the first director camera and the second director camera based on the speech mode in the preset past time period.

4. The method according to claim 3, wherein the determining the speech mode comprises:
determining a quantity of effective speakers based on the speech information of the speakers; and
determining the speech mode based on the quantity of effective speakers.

5. The method according to claim 4, wherein the obtaining a quantity of effective speakers comprises:
determining a quantity of effective speech times of each speaker based on a priority of each speaker in the preset time period and speech duration of each speaker in each speech in a preset time period;
determining a speaker whose quantity of effective speech times is greater than or equal to 1 as an effective speaker; and
determining a quantity of effective speakers as the quantity of effective speakers.

6. The method according to claim 4, wherein the determining the speech mode comprises:
when the quantity of effective speakers is 1, determining that the speech mode in a preset time period is the single-person speech mode;
when the quantity of effective speakers is 2, if the two effective speakers speak alternately, determining that the speech mode in the preset time period is the single-person speech mode or the double-person debate mode; or
when the quantity of effective speakers is greater than 2, determining, based on priorities of at least two effective speakers in the preset time period, that the speech mode in the preset time period is the single-person speech mode or the multi-person discussion mode.

7. The method according to claim 3, wherein the speech mode is the single-person speech mode; and the adjusting the shooting angle or the focal length of at least one of the first director camera and the second director camera based on the speech comprises:
determining a target speaker from the effective speakers; and
adjusting the shooting angle or the focal length of the second director camera, so that a face image of the target speaker is located at a target shooting location of the second director camera.

8. The method according to claim 3, wherein the speech mode is the double-person debate mode; and the adjusting the shooting angle or the focal length of at least one of the first director camera and the second director camera based on the speech mode comprises:
if a distance between two effective speakers in the preset time period is less than a preset distance, adjusting the shooting angle or the focal length of the second director camera, so that face images corresponding to the two effective speakers are located at a target shooting location of the second director camera; or
if a distance between two effective speakers is greater than or equal to a preset distance, adjusting the shooting angle or the focal length of at least one of the first director camera and the second director camera, so that a face image corresponding to one of the two effective speakers is located at a target shooting location of the first director camera and a face image corresponding to the other effective speaker is located at a target shooting location of the second director camera.

9. The method according to claim 3, wherein the speech mode is the multi-person discussion mode; and the adjusting the shooting angle or the focal length of at least one of the first director camera and the second director camera based on the speech mode comprises:
if a distance between the at least two effective speakers in the preset time period is less than a preset distance, adjusting the shooting angle or the focal length of the second director camera, so that face images corresponding to the at least two effective speakers are located at a target shooting location of the second director camera; or
if a distance between the at least two effective speakers is greater than or equal to a distance threshold, adjusting the shooting angle or the focal length of the second director camera, so that the second director camera shoots a panoramic video.

10. The method according to claim 1, wherein the determining speech information of a speaker based on first video information collected by the first camera and first audio information collected by the plurality of microphones MICs comprises:
determining, based on video information and audio information that are corresponding to moments in a preset time period, speakers corresponding to the moments; and collecting statistics about the speakers corresponding to the moments to obtain the speech information of the speakers, wherein the speech information of the speakers comprises at least one piece of the following information: a quantity of speakers in the preset time period, speech duration of each speaker, a quantity of speech times of each speaker, speech content of each speaker, speech duration of each speech, a speech moment of each speech, or a priority of each speaker.

11. A director device comprising a processor and interface, wherein the interface is configured to communicate with a camera, and the processor is configured to perform operations comprising:
    determine historical speech information of speaker in a preset time period based on first video information collected by a first camera in the preset time period and first audio information collected by a plurality of microphones (MICs) in the preset time period, wherein the preset time is in the past;
    determine a current speaker based on second video information currently collected by the first camera and second audio information currently collected by the plurality of MICs; and
    control a director status of director cameras based on the speech information of a speaker, the current speaker, and a speaker currently shot by at least one director camera, wherein the director status of a director camera comprises a shooting angle or a focal length, and when the current speaker is different from the speaker shot by the first director camera at the current moment, controlling a director status adjusts the shooting angle or the focal length of at least one of the first director camera and the second director camera based on the historical speech information, wherein the at least one director camera is configured to send a director video stream to another conference site.

12. The director device, according to claim 11, wherein the processor is further configured to:
    when the current speaker is the same as a speaker shot by the first director camera, keep a shooting angle and a focal length of the first director camera unchanged, wherein a pilot video currently shot by the first director camera is sent to the another conference site.

13. The director device according to claim 11, wherein the processor is configured to:
    when the current speaker is different from the speaker currently shot by the first director camera, determine a speech mode in the preset time period based on the speech information of the speaker, wherein the speech mode comprises at least one of a single-person speech mode, a double-person debate mode, or a multi-person discussion mode; and
    adjust the shooting angle or the focal length of at least one of the first director camera and the second director camera based on the speech mode in the preset time period.

14. The director device according to claim 13, wherein the processor is configured to:
    determine a quantity of effective speakers in the preset time period based on the speech information of the speaker; and
    determine the speech mode in the preset time period based on the quantity of effective speakers in the preset time period.

15. The director device according to claim 14, wherein the processor is configured to:
    determine a quantity of effective speech times of each speaker based on a priority of each speaker in the preset time period and speech duration of each speaker in each speech in the preset time period;
    determine a speaker whose quantity of effective speech times is greater than or equal to 1 as an effective speaker; and
    determine a quantity of effective speakers as the quantity of effective speakers.

16. The director device according to claim 14, wherein the processor is configured to:
    when the quantity of effective speakers is 1, determine that the speech mode in the preset time period is the single-person speech mode;
    when the quantity of effective speakers is 2, if the two effective speakers speak alternately, determine that the speech mode in the preset time period is the single-person speech mode or the double-person debate mode; or
    when the quantity of effective speakers is greater than 2, determine based on priorities of at least two effective speakers in the preset time period, that the speech mode in the preset time period is the single-person speech mode or the multi-person discussion mode.

17. The director device according to claim 13, wherein for the speech mode being the single-person speech mode, the processor is configured to:
    determining, by the director device, a target speaker from the effective speakers in the preset time period; and
    adjusting, by the director device, the shooting angle or the focal length of the second director camera, so that a face image of the target speaker is located at a target shooting location of the second director camera.

18. The director device according to claim 13, wherein for speech mode being the double-person debate mode, the processor is configured to:
    if a distance between two effective speakers in the preset time period is less than a preset distance, adjust the shooting angle or the focal length of the second director camera, so that face images corresponding to the two effective speakers are located at a target shooting location of the second director camera; or
    if a distance between two effective speakers in the preset time period is greater than or equal to a preset distance, adjust the shooting angle or the focal length of at least one of the first director camera and the second director camera, so that a face image corresponding to one of the two effective speakers is located at a target shooting location of the first director camera and a face image corresponding to the other effective speaker is located at a target shooting location of the second director camera.

19. The director device according to claim 13, wherein for the speech mode being the multi-person discussion mode, the processor is configured to:
    if a distance between the at least two effective speakers in the preset time period is less than a preset distance, adjust the shooting angle or the focal length of the second director camera, so that face images corresponding to the at least two effective speakers are located at a target shooting location of the second director camera; or if a distance between the at least two effective speakers in the preset time period is greater than or equal to a preset distance, adjust the shooting angle or the focal length of the second director camera, so that the second director camera shoots a panoramic video.

20. The director device according to claim 11, wherein the processor is configured to:

determine based on video information and audio information that are corresponding to moments in the preset time period, speakers corresponding to the moments; and collect statistics about the speakers corresponding to the moments to obtain the speech information of the speakers, wherein the speech information of the speakers comprises at least one piece of the following information: a quantity of speakers in the preset time period, speech duration of each speaker, a quantity of speech times of each speaker, speech content of each speaker, speech duration of each speech, a speech moment of each speech, or a priority of each speaker.

* * * * *

UNITED STATES PATENT AND TRADEMARK OFFICE
CERTIFICATE OF CORRECTION

PATENT NO. : 10,873,666 B2  
APPLICATION NO. : 16/791268  
DATED : December 22, 2020  
INVENTOR(S) : Zheng Page 1 of 1

It is certified that error appears in the above-identified patent and that said Letters Patent is hereby corrected as shown below:

In the Claims

In Column 27, Line 11, in Claim 1, delete "MIC5;" and insert --MICs;--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*